(12) United States Patent
Nimri et al.

(10) Patent No.: US 11,513,678 B2
(45) Date of Patent: Nov. 29, 2022

(54) CONTEXT BASED ANNOTATING IN AN ELECTRONIC PRESENTATION SYSTEM

(71) Applicant: Polycom, Inc., San Jose, CA (US)

(72) Inventors: Alain Nimri, Austin, TX (US); Shu Gao, Round Rock, TX (US); Stephen Schaefer, Cedar Park, TX (US); Robert Murphy, Austin, TX (US); Daniel Palmer, Austin, TX (US)

(73) Assignee: POLYCOM, INC., San Jose, CA (US)

( * ) Notice: Subject to any disclaimer, the term of this patent is extended or adjusted under 35 U.S.C. 154(b) by 1013 days.

(21) Appl. No.: 15/615,642

(22) Filed: Jun. 6, 2017

(65) Prior Publication Data

US 2018/0349015 A1 Dec. 6, 2018

(51) Int. Cl.
| | |
|---|---|
| G06F 3/04883 | (2022.01) |
| G06F 3/0484 | (2022.01) |
| G06F 3/041 | (2006.01) |
| G06V 30/32 | (2022.01) |
| G06V 30/142 | (2022.01) |

(52) U.S. Cl.
CPC ........ *G06F 3/04883* (2013.01); *G06F 3/0416* (2013.01); *G06F 3/0484* (2013.01); *G06V 30/1423* (2022.01); *G06V 30/333* (2022.01); *G06F 2203/04808* (2013.01)

(58) Field of Classification Search
CPC .. G06F 3/04883; G06F 3/0416; G06F 3/0484; G06F 16/20; G06F 2203/04808; G06F 2203/048; G06F 3/0482; G06F 3/0481; G06F 16/5846; G06F 3/04845; G06K 9/00409; G06K 9/222; G06K 9/00422; G06T 15/005; G01C 21/3636; G01C 21/3667

See application file for complete search history.

(56) References Cited

U.S. PATENT DOCUMENTS

| | | |
|---|---|---|
| 6,304,674 B1 * | 10/2001 | Cass ..................... G06K 9/222 |
| | | 382/103 |
| 6,445,384 B1 | 9/2002 | Atwood et al. |
| 6,654,008 B2 | 11/2003 | Ikeda et al. |
| 6,724,373 B1 | 4/2004 | O'Neill, Jr. et al. |
| 6,999,061 B2 | 2/2006 | Hara et al. |
| 8,421,752 B2 | 4/2013 | Deluca |
| 8,615,793 B2 | 12/2013 | Theimer et al. |
| 8,638,297 B2 | 1/2014 | Deluca |
| 8,816,958 B2 | 8/2014 | Kalu et al. |

(Continued)

*Primary Examiner* — Sherrod L Keaton
(74) *Attorney, Agent, or Firm* — Lindauer Law, PLLC

(57) ABSTRACT

A presentation system capable of detecting one or more gestures and contacts on a touch sensitive display. The presentation system can displaying indicia of such contacts, such as when a user writes with a fingertip, and can remove or alter such indicia responsive to other gestures and contacts. The system can accurately distinguish between types of gestures detected, such as between a writing gesture and an erasing gesture, on both large and small touch sensitive displays, thereby obviating the need for a user to make additional selective inputs to transition from one type of gesture to another. The system can determine how long to keep user annotations displayed during a presentation, based on the nature of the gesture used to make the annotations and the context in which they are made.

21 Claims, 16 Drawing Sheets

(56) References Cited

U.S. PATENT DOCUMENTS

| | | | | |
|---|---|---|---|---|
| 2011/0265034 A1* | 10/2011 | Garin | ............... | G06F 3/0425 |
| | | | | 715/810 |
| 2013/0191768 A1* | 7/2013 | Thompson | ......... | G06F 3/04883 |
| | | | | 715/765 |
| 2013/0307861 A1* | 11/2013 | Lang | ............... | G06F 3/04883 |
| | | | | 345/582 |
| 2013/0342486 A1* | 12/2013 | Xin | ............... | G06F 3/041 |
| | | | | 345/173 |
| 2014/0082545 A1* | 3/2014 | Zhai | ............... | G06F 3/04886 |
| | | | | 715/773 |
| 2014/0082570 A1* | 3/2014 | Chung | ............... | G06F 3/0488 |
| | | | | 715/863 |
| 2014/0101619 A1* | 4/2014 | Kaldor | ............... | G06F 3/0418 |
| | | | | 715/863 |
| 2014/0109018 A1* | 4/2014 | Casey | ............... | G06F 3/04883 |
| | | | | 715/863 |
| 2015/0177904 A1* | 6/2015 | Makuch | ............... | A63F 13/426 |
| | | | | 345/178 |
| 2015/0363035 A1* | 12/2015 | Hinckley | ............... | G06F 3/0383 |
| | | | | 345/173 |
| 2016/0149976 A1* | 5/2016 | Emori | ............... | G06F 3/04883 |
| | | | | 709/205 |
| 2016/0155212 A1* | 6/2016 | Ogasawara | ............... | G06T 3/40 |
| | | | | 715/732 |
| 2016/0155242 A1* | 6/2016 | Bean | ............... | G06T 15/503 |
| | | | | 345/592 |
| 2017/0329509 A1* | 11/2017 | Lee | ............... | G06F 3/04883 |

* cited by examiner

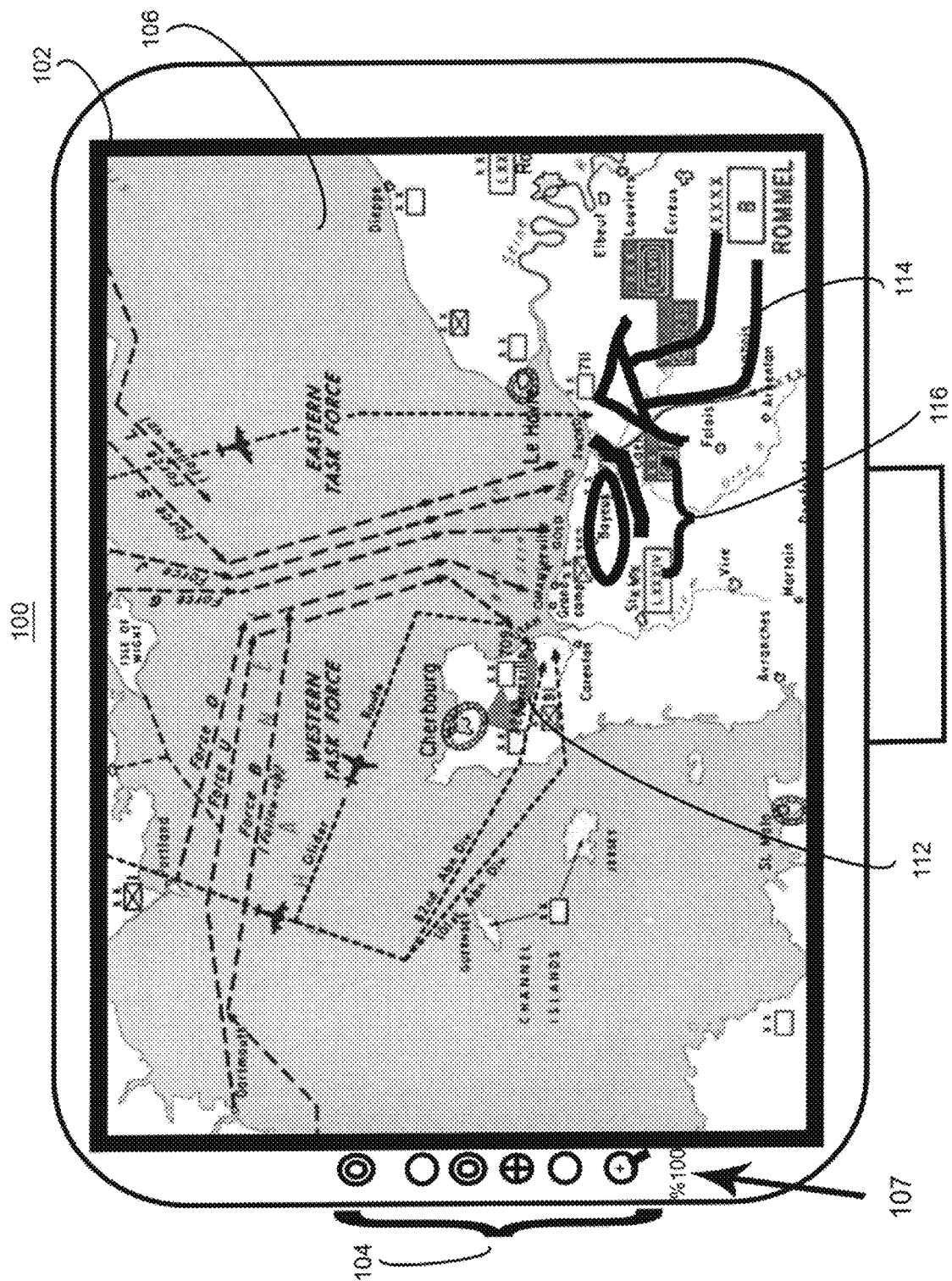

CONTEXT BASED ANNOTATING IN AN ELECTRONIC PRESENTATION SYSTEM

CROSS-REFERENCE TO RELATED APPLICATIONS

This application is related to U.S. application Ser. No. 15/615,675, filed Jun. 6, 2017, U.S. application Ser. No. 15/615,664, filed Jun. 6, 2017, U.S. application Ser. No. 15/615,707, filed Jun. 6, 2017, and to U.S. application Ser. No. 15/615,606, filed Jun. 6, 2017, the contents of which applications are entirely incorporated by reference herein.

TECHNICAL FIELD

This disclosure is generally concerned with display systems, and more specifically presentation systems capable displaying and removing annotations from displayed content.

BACKGROUND

A common annotation method for electronic whiteboards is to annotate using a stylus or finger to draw, underline or circle a point which a user wishes to emphasize. The highlighter may be used on a blank whiteboard as a disappearing drawing, or as a highlighter on a fixed slide or a moving video. If the user (presenter) wishes to emphasize multiple talking points during a presentation, the user must first undo the last annotation, or use an UNDO button to delete the last several markups or annotations.

In conventional whiteboards, the electronic ink used to display writing is either preset or set after detecting several gestures. Once set, the ink must be selectively reset by a user. If the user wishes to make writings and markings in a single sitting, making the selections necessary can be disruptive.

In conventional systems, when drawing on a digital whiteboard with one's finger, it is common to have one's wrist or knuckles accidentally touching the touch surface, resulting in false detection of multi-finger touch.

In conventional systems, when a user wishes to make an erasing action, the user must make a manual selective input to indicate a desire to do so.

This disclosure is intended to address these shortcomings in the art.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings:

FIGS. 1A-H illustrate an example presentation system in accordance with an embodiment of this disclosure;

DETAILED DESCRIPTION

Figure 1A:
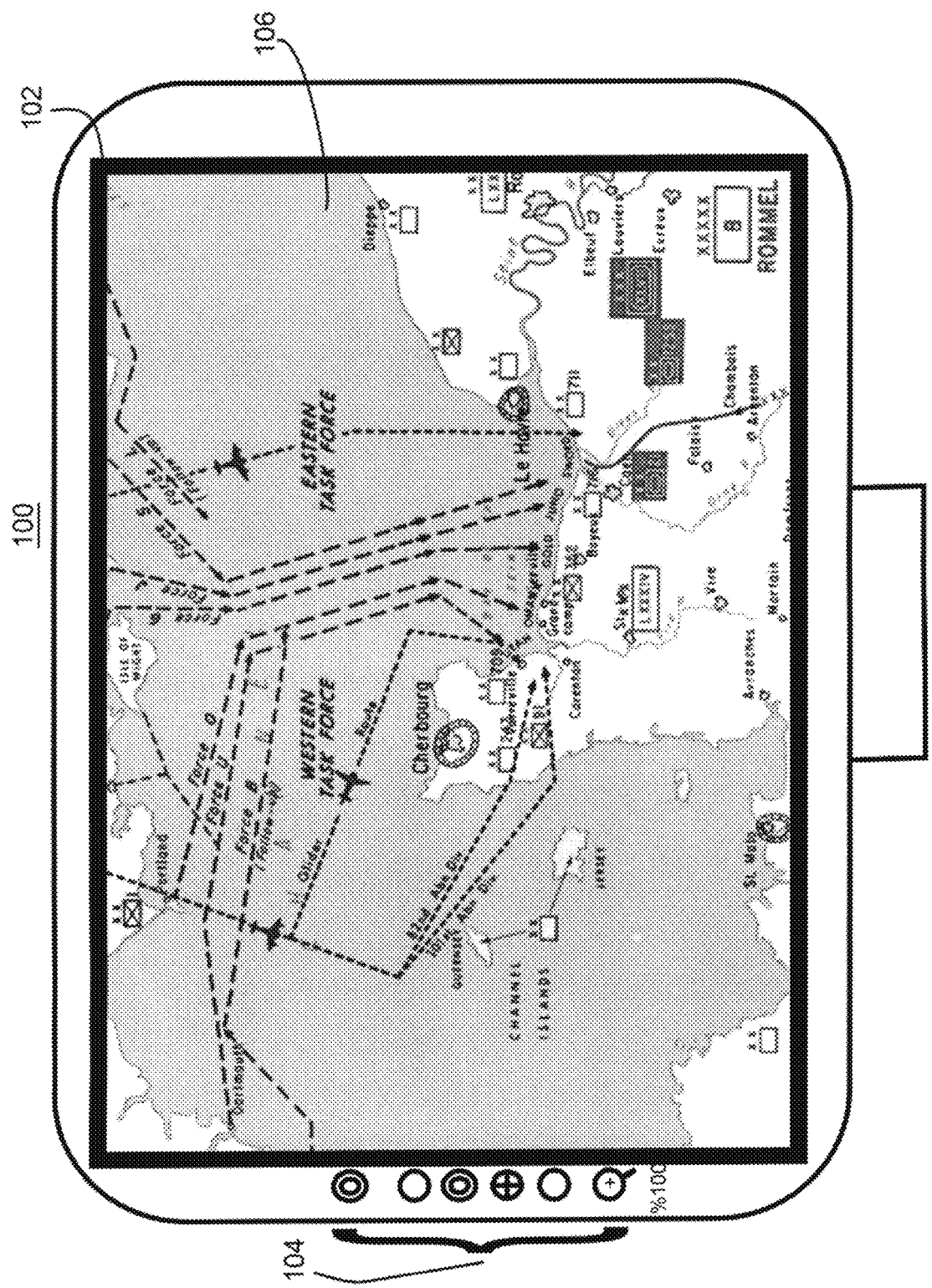

Reference to the drawings illustrating various views of exemplary embodiments is now made. In the drawings and the description of the drawings herein, certain terminology is used for convenience only and is not to be taken as limiting the embodiments of the present disclosure. Furthermore, in the drawings and the description below, like numerals indicate like elements throughout.

Descriptions of terms used within this disclosure are provided as follows. 'Coupled' refers to components or devices which able interact with one another, either directly or indirectly. All connected elements are coupled, but not all coupled elements are connected. Coupled elements include those which are in communication with each other. A 'presentation system' includes devices and systems useable to provide a presentation to an audience of one or more persons. A presentation system can include a touch sensitive display. A 'touch point' includes a detected area of contact, such as by a fingertip or stylus on a touch sensitive display. It is to be understood that input received by a first touch sensitive device, such as a mousepad or touch sensitive display, may be used to affect another display. A 'touch gesture', or simply a 'gesture,' includes multiple touch points on a touch sensitive display imposed in a continuous or substantially continuous manner. For example, the motion of a stylus or finger across a portion of a touch sensitive display would constitute a gesture. An 'erasure gesture' is a gesture imposed for the purpose of removing indicia or markings or annotations etc. displayed on a display device. A gesture will have a (changing) velocity corresponding to the rate at which a touch contact moves. The term 'style' includes a font, display characteristics and general rules pertaining to display of textual or notational information, such as the general manner in which writing or other markings are presented. Gestures and touch points on a touch sensitive display can cause the display to display or remove information related to the gesture. 'Proximity' refers to the degree to which items or elements or components etc. are close to one another. Elements are 'proximate' when they are near each other as would be understood by a person of skill based on the context.

Presenters who use electronic whiteboards will often highlight different aspects of a presentation slide, picture or a video by using an electronic pen. They may circle or use an arrow, for example, to illustrate a specific point on a slide. If the presenter now wants to highlight a different portion of the slide they may use an erase to erase the previous markings and then make new markings. The presenter may use an UNDO button, for example, to erase previous annotations and then make new annotations. This can become awkward and distracting if there are many annotations to be made on the same slide that are not related to each other. In this conventional case, previous annotations have to be deleted before new ones are made.

At least one embodiment of this disclosure is a presentation system in which annotations made on a whiteboard will eventually and gradually dissolve over time. In this way, new annotations can be made without having to affirmatively remove residual annotations previously made. In an embodiment, the decision of how long an annotation remains displayed may be based on many factors including the time it took to make the annotations, the length of strokes involved, how strokes are grouped, and the amount of time between one annotation and the next, for example. In implementations of the technology, different detectors can be implemented to determine how long to keep an annotation. Such detectors include, but are not limited to a group of strokes detector, a length of strokes detector, a number of strokes in a group detector, and a repeated overlapping pen strokes detector. Such detectors can operate alone or in conjunction with one or more of the others.

In embodiments of this disclosure, users of electronic whiteboards do not have to erase previous annotations when repeated annotations are required on the same surface. This enables the flow of a presentation to be more natural and flowing than if the user had to manually erase or undo existing annotations. In an embodiment, a (virtual) highlighter may be used to (virtually) mark on a blank whiteboard with a disappearing drawing, or as a highlighter on content such as a fixed slide or moving video. According to an embodiment, when annotating on a moving video, the annotation may be only relevant for a short period of time as the video content may have changed. In this case it is advantageous to have the annotation disappear after a time.

In at least one embodiment, instead of having an annotation disappear, a presentation system could cause it to change to a different color. In an embodiment, a presentation system can be configured to store annotated figures periodically, or before performing a fade operation, or upon a manual selection by a user. This can enable a user to make a series of annotations along a given path of discussion, and then return to the user's original point to take a different path. Alternatively, a series of annotations could be made and then subsequently shown at the same time for a presenter to make an overall point.

In embodiments of this disclosure, the length of time an annotation remains after being made can depend one or more factors, and such factors can be weighted differently. Such factors include, but are not limited to the amount of time spent making the mark, the size of the area (number of points) marked, and whether the mark was preceded or followed by one or more similar markings. A presentation system can be configured to treat a group of markings collectively, treating them, in effect, as a single mark. A presentation system can also be configured to recognize a gesture indicative of a desire by a user to allow the subsequent markings to remained displayed another gesture is received. In at least one embodiment, an existing marking is fading as another annotation is being made, the fading marking can be reconstituted, and the length of time until which it will fade reset.

Embodiments of the disclosure use various criteria to determine how long to display a marking. Such criteria include, but are not limited to, the length of time spent on a single stroke, the length of a line drawn, the number of strokes that occur close in time to one another, the gap in time since a previous mark was made, the velocity of a writing, and whether the marking is an original drawing or an annotation. Thus if a user spends a long time writing the user likely wants the writing to stay up longer. On the other hand, if a user makes a short stroke, than the system may determine that the mark is simply a pointer, and cause it to disappear more quickly.

In at least one embodiment, the presentation system may be configured to cause a mark or markings to remain display for a longer time if the user holds a finger or stylus in substantially the same place on a touch screen for a predetermined amount of time, such as for 2.5 seconds or longer, for example. The system can be configured such that if there are several groups of strokes separated by time, the system can consider the group as a single marking event, and therefore cause the marks in the group to fade and disappear concurrently. Presentation systems of this disclosure can be configured such that if a user touches an existing a group of marks the group will remain displayed longer than would have otherwise been the case.

FIG. 1A illustrates an example presentation system 100. The presentation system depicted is an electronic whiteboard (or more simply 'whiteboard'). However, the description herein applies equally well to other devices which have touch sensitive displays, or any device capable of receiving gesture type inputs and translating them into changes in displayed information, such as a tablet computer, for example. Presentation system 100 includes touch sensitive display 102 and multiple actuable/selectable inputs 104. In the illustration, touch sensitive display 102 is being used to display content 106, which corresponds to an historical tactical map as might be presented as part of a history lesson. Actuable/selectable inputs 104 can receive input selections from one or users, such as to select marking color, zoom in on a portion of content, and to save annotated content for subsequent retrieval.

Figure 1B:
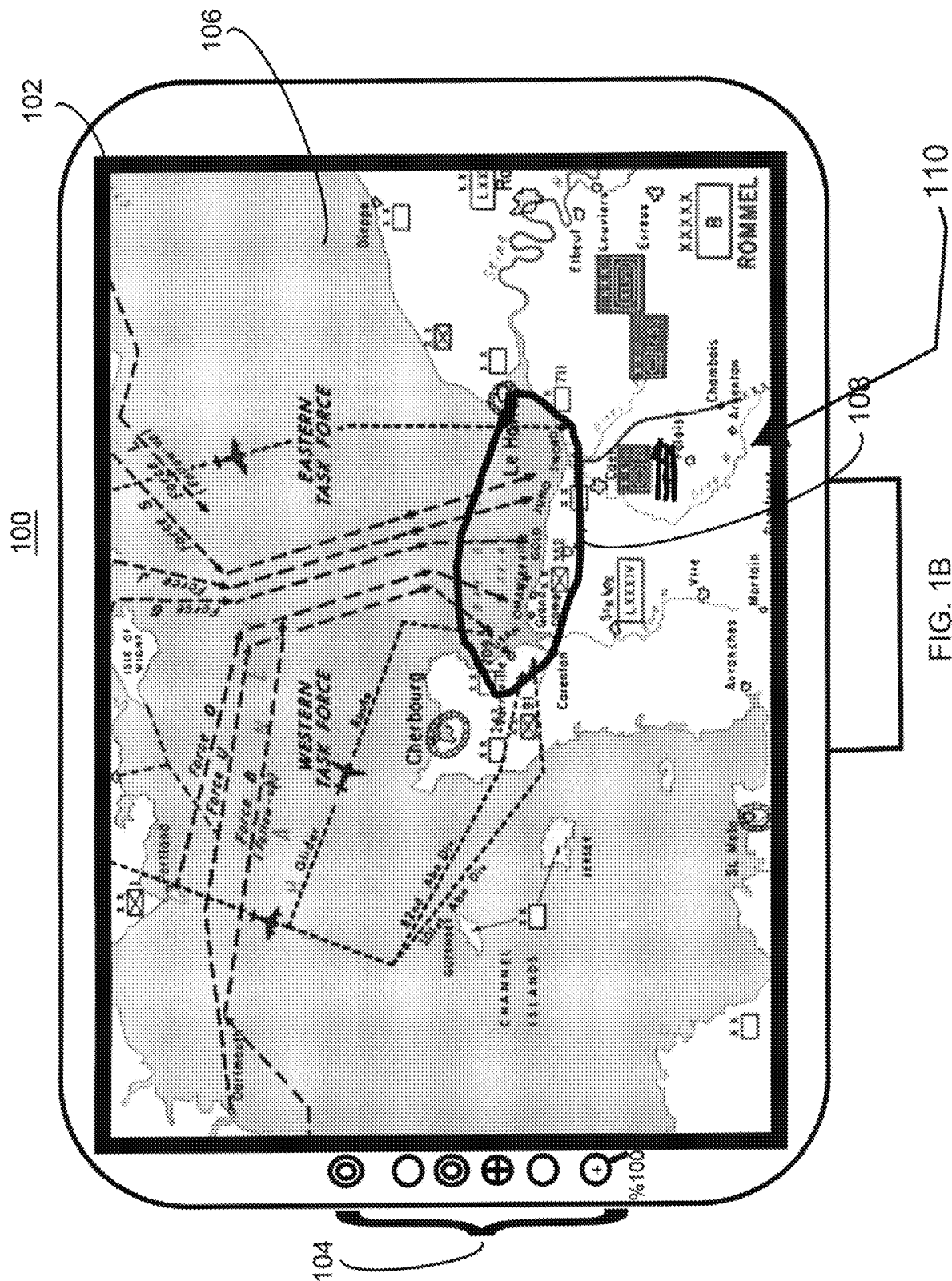
Figure 1C:
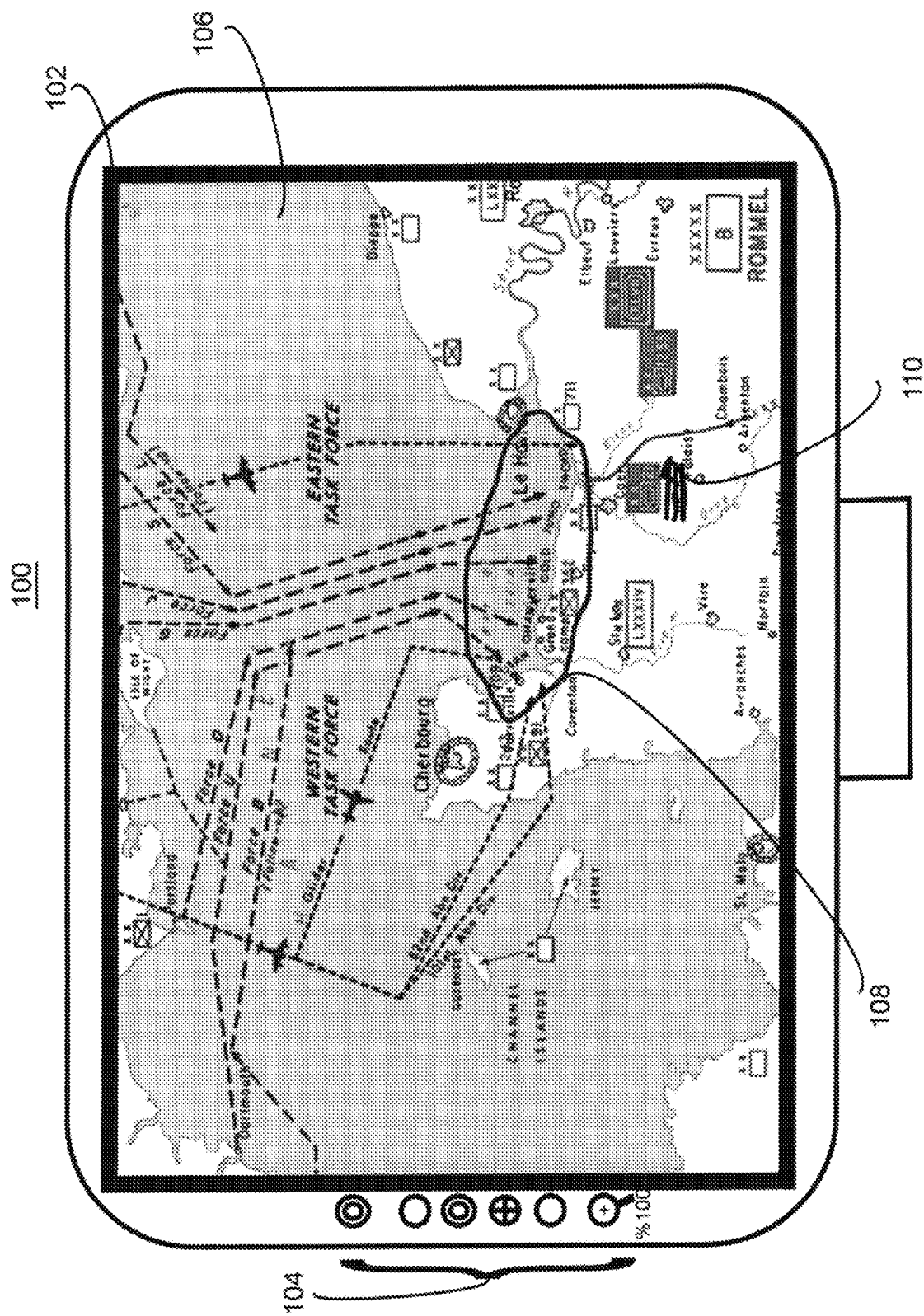
Figure 1D:
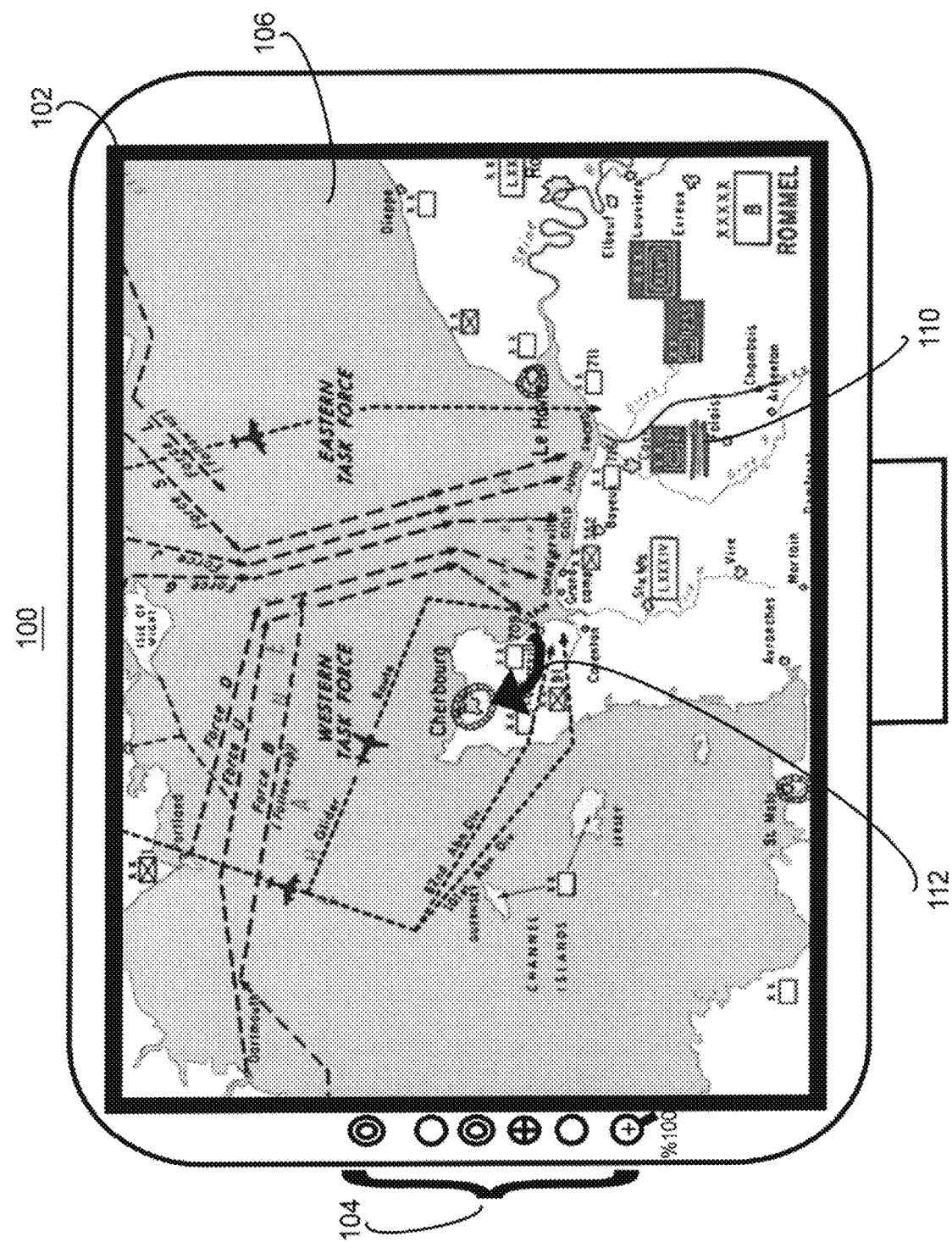

In FIG. 1B, the presenter (perhaps a history professor), has traced 108 around the main landing sites of the Allied Forces on Jun. 6, 1944, code named Utah, Omaha, Gold, Juno and Sword Beaches. The tracing may be performed using a finger or stylus (for example). The presentation system loo detects the motion of the presenter's finger and displays annotation 108 along the path traced. Annotation 108 is added at time t–0. The presenter then proceeds to annotate an enemy position at Caen with three lines 110 at t–1. In FIG. 1C, it can be seen that tracing annotation 108 has begun to fade at t–3, while markings 110, which were drawn after 108, have not. At t–4 in FIG. 1D, the presenter has made a gesture to draw an arrow 112 marking the intended path of troops from Utah Beach towards Cherbourg. Annotation 112 is thicker than annotations 108 and 110 were. As described, this difference could be because the presenter took additional time to make the mark 112, or because the presenter made the marking gesture more than once. In either case, the system 100 has effectively determined that the presenter wishes to emphasize the subject matter (such as from lecture notes) being discussed with regard to the action at Caen. It can also be seen that at t–4 annotation 108 has disappeared, and markings 110 are fading. Notably, although the individual lines of 110 were made sequentially, the system 100 has determined that lines 110 are directed to the same talking point. This determination could be based on factors including that lines 110 were made very near in time, are substantially the same shape, and run in substantially the same direction, and took substantially the same amount of time to make. The presentation system 100 can also be configured to interpret the small size of markings 110 as an indication of less relative importance, and therefore cause 110 to fade and disappear more quickly than some of the larger annotations.

Figure 1E:
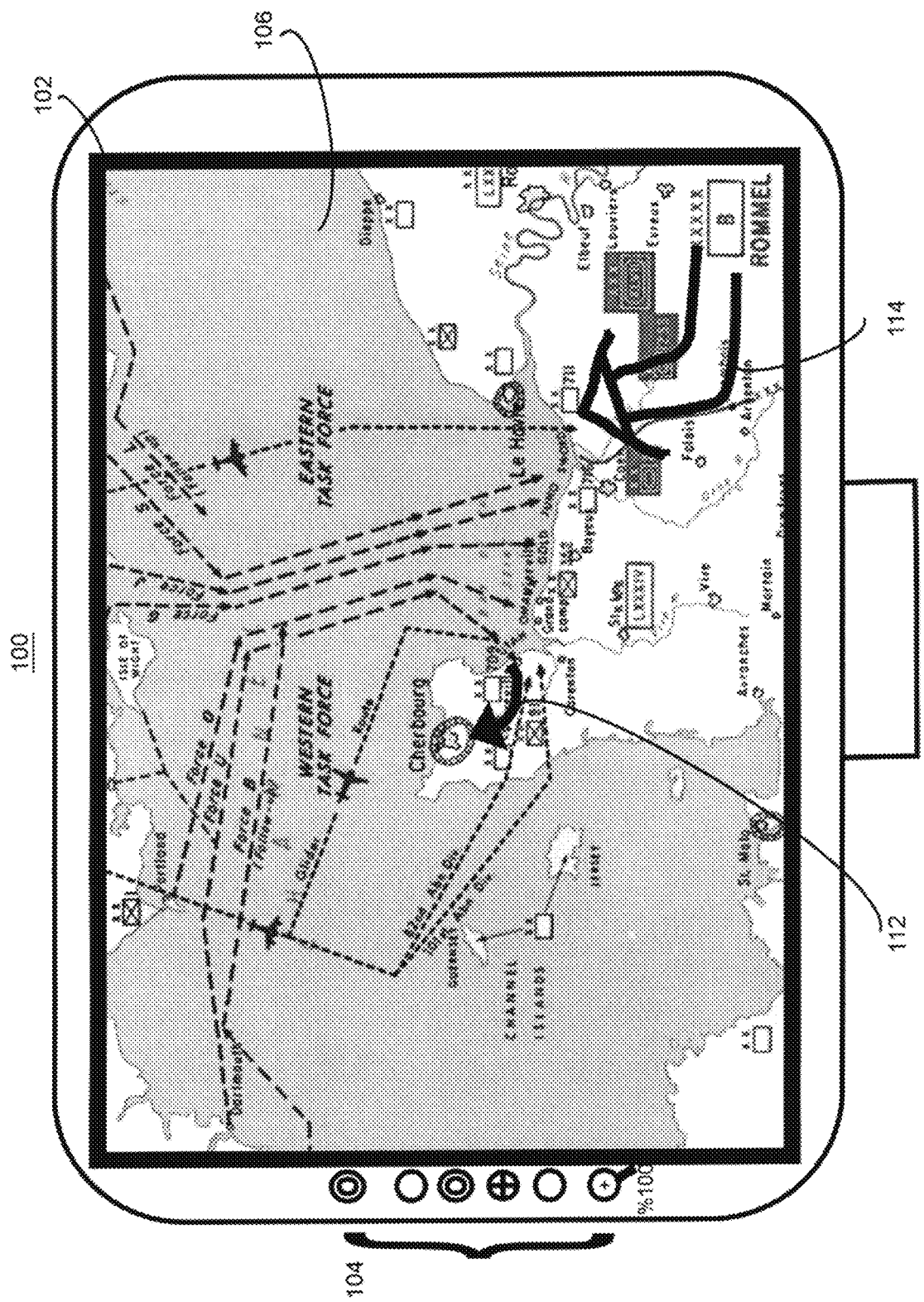

In FIG. 1E it can be seen that the presenter has drawn a very large arrow 114 at t–5 using multiple lines and strokes to indicate the projected enemy counter attack by Army Group B towards the North West. The amount of time between when 112 was drawn (t–4) and when 114 was drawn (t–5) could be greater than between t–1 and t–2, or t–2 and t–3, for example, because of the system 100 interpreted the gestures used to make 112 as indicating greater emphasis. The size of the overall shape of 114, as well as the number of strokes required to make it, can be interpreted by the system 100 to mean that the markings 114 are also very important to the presenter. In FIG. 1F, the presenter has made additional markings 116 at t–6, consisting of a thick oval type shape around the town of Bayeux and a thick somewhat jagged line to the east of Bayeux, indicating the main line of resistance which the Allies could have been expected to establish in anticipation of the attack from Army Group B depicted by large arrow 114. It can be seen too that although a larger amount of time has passed than between the earlier annotations, the route 112 from Utah Beach to Cherbourg has only just started to fade at t–6. Given that the user has made markings 116 at Bayeux, the presenter may desire to zoom in on that region of content 106. In the embodiment shown, a user can zoom in on a region by selecting icon 107. There are other ways to cause zooming within this disclosure, such as by contacting the touchscreen with two fingers in the area of interest and moving the fingers apart while maintaining contact.

Figure 1G:
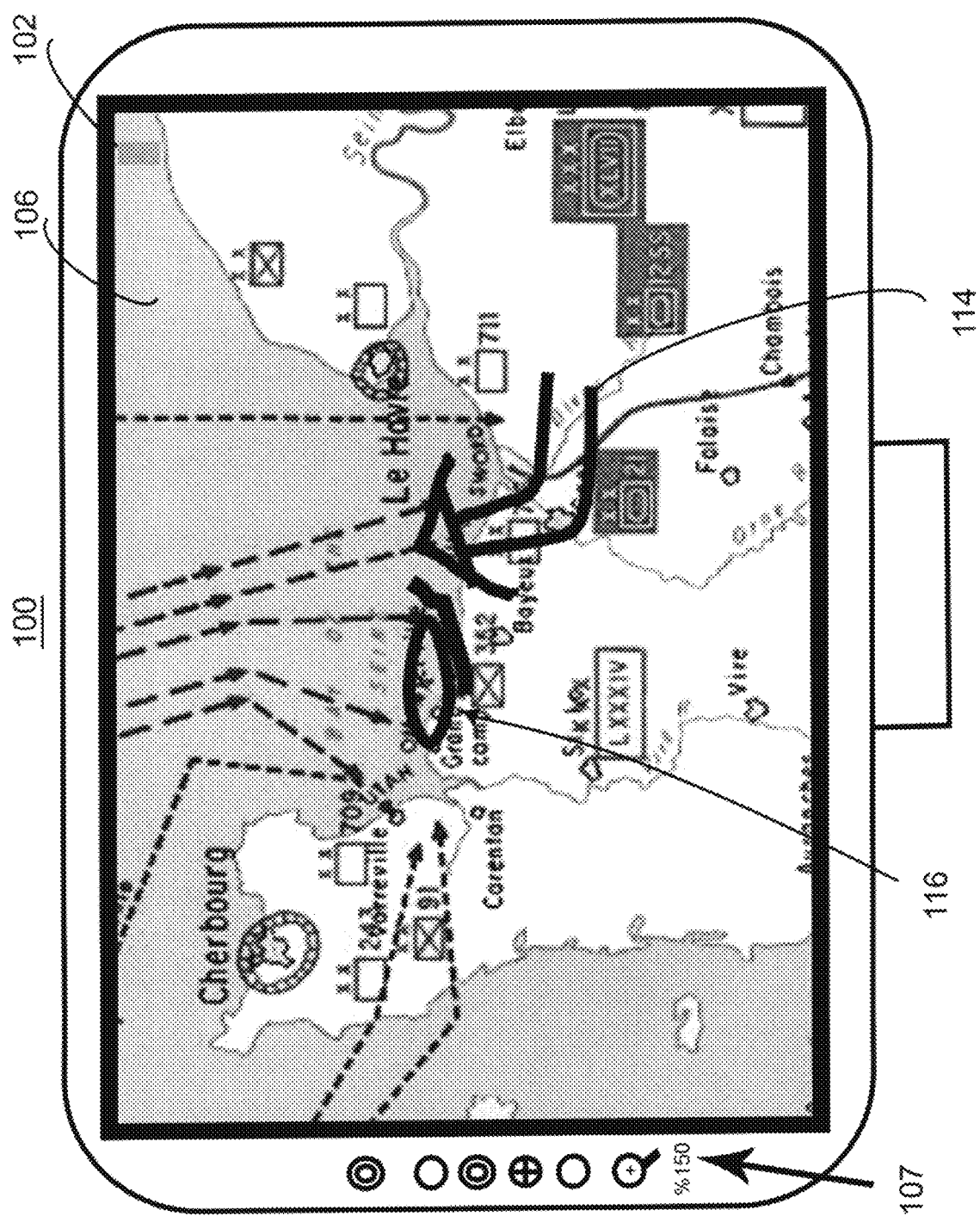
Figure 1H:
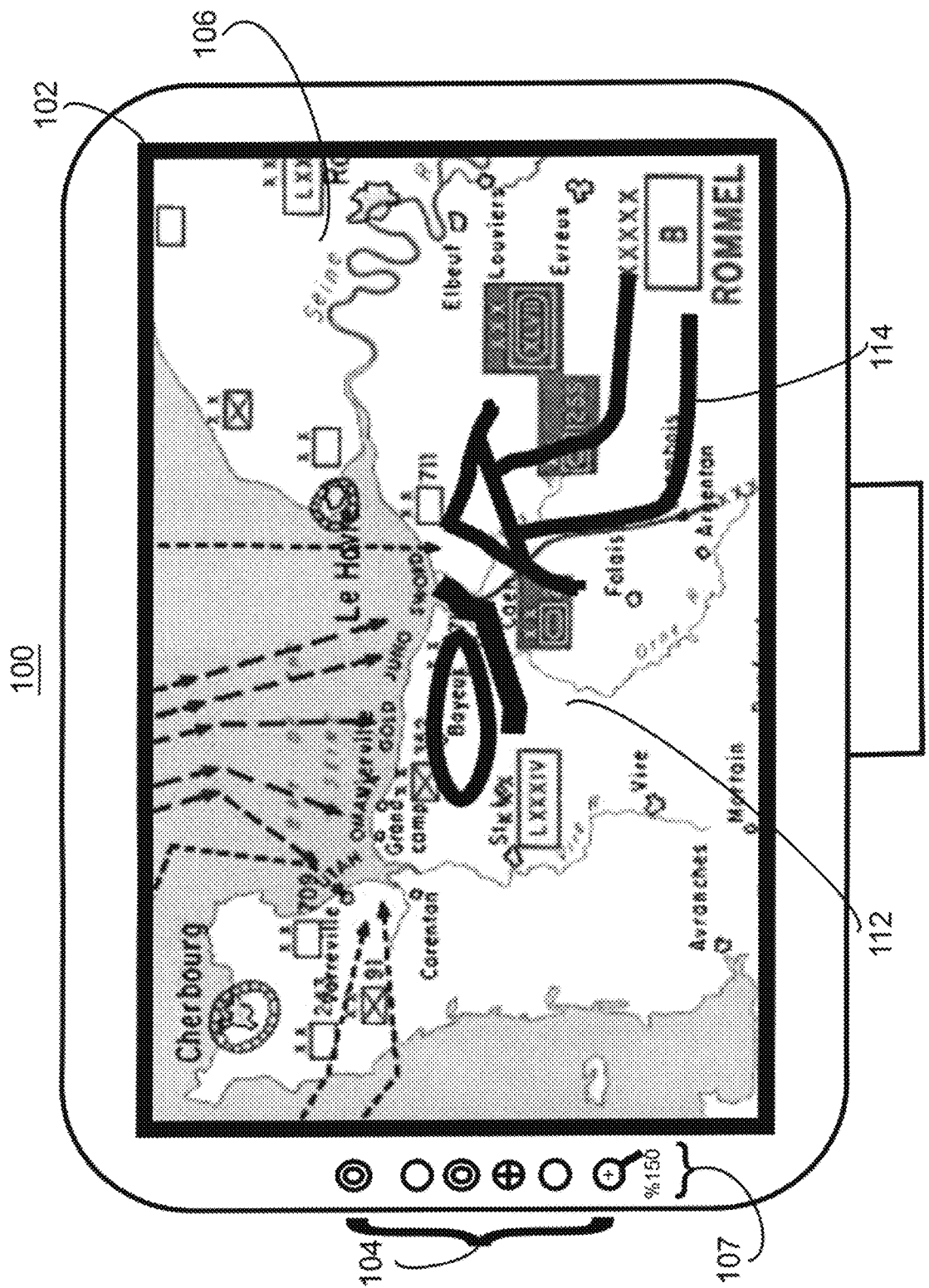

FIG. 1G illustrates a presentation system 100 in which a zooming action has occurred, as evidenced by the change in icon 107. It can be seen that the Bayeux area is larger in FIG. 1G than in 1F. However, annotations 114 and 116 have not changed—they are the same size as before, and because the scale of content 106 has changed, annotations 114 and 116 are out of place. FIG. 1H illustrates a presentation system 100 in which a zooming action has occurred according to an improved method in which a portion of displayed content 106 is enlarged as in FIG. 1G. However, the scale of annotations 114 and 116 has been changed by the same amount as that of content 106. Thus, the presenter is able to zoom on the annotated (114, 116) area of interest without having to interrupt the flow of her presentation to resize or delete annotations 114 and 116. The learning experience is thereby enhanced.

At least one embodiment of this disclosure is a presentation system having an adaptive electronic inking (or simply 'ink'). Inking is technique whereby a system can to give character or "flair" to drawings and writings on the board. Within one stroke, the property of the line like thickness, transparency, and or pattern can vary based on the movement of an electronic pen or stylus etc. These automatic variations are intended to provide a writing experience that feels natural. Within this disclosure, different inks correspond to different properties of displayed markings (writings). Inks can be characterized by variations in thickness and levels of transparency (or opacity) of their strokes. At least one embodiment of this disclosure is a method of automatically changing the type of ink used (displayed) based on the context of the usage of the digital whiteboard.

Figure 2:
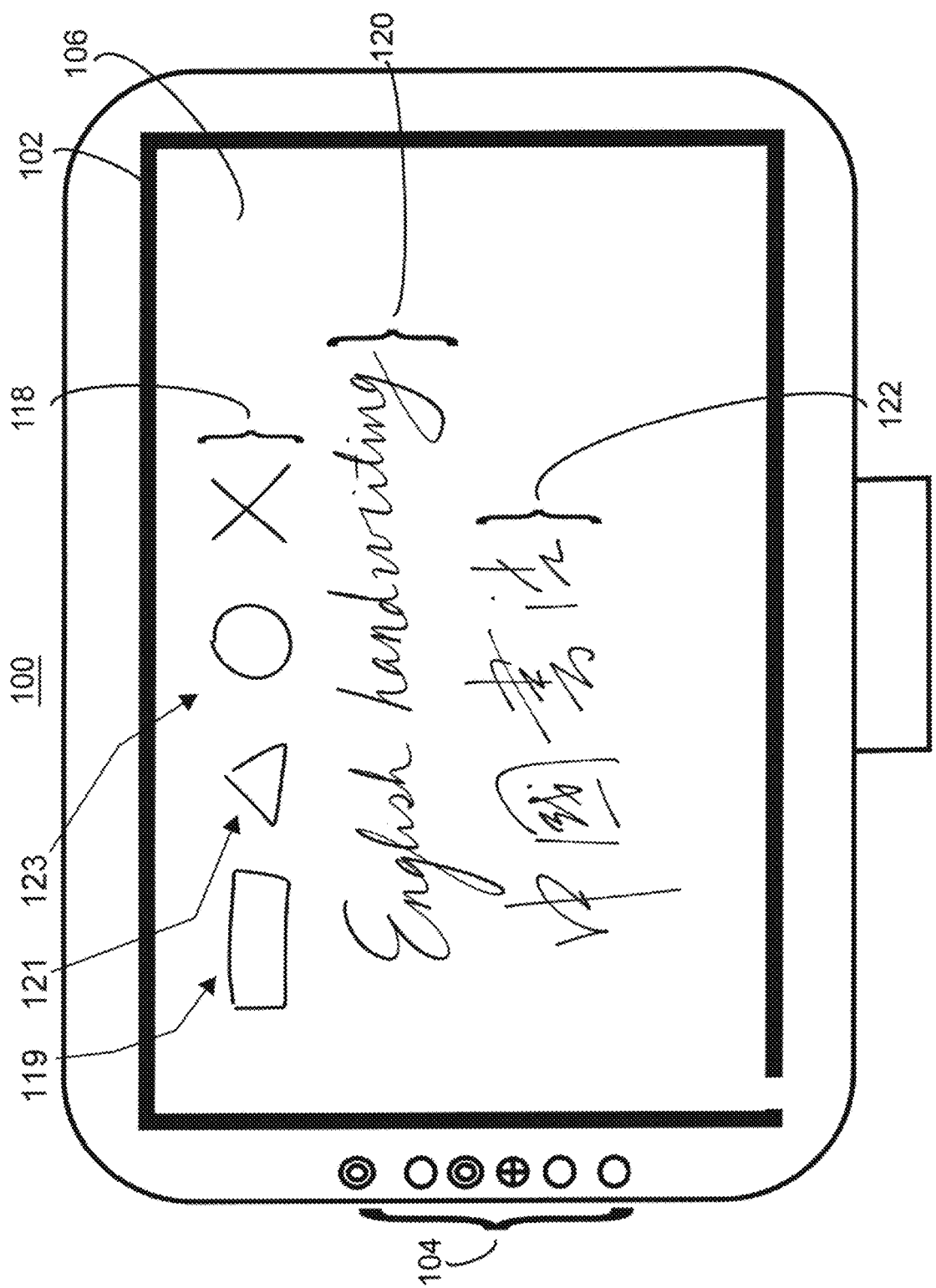
FIG. 2 illustrates a presentation system displaying different types of ink in accordance with an embodiment of this disclosure.

In one embodiment of this disclosure, the thickness of a line varies based on the direction of the stroke at any given point along a path traced by a writing implement, (see FIG. 2, 120). Notice that the lineage of 120 is thinnest when its direction is going "north east" (i.e., 45 degrees from bottom left to upper right). The line is thickest in the opposite direction (i.e., 45 degrees from upper right to bottom left). This variation of thickness reflects the basic rule of calligraphy for English (and other Roman based languages). That is, a writer will generally press down harder when going from top to bottom, yielding a thicker stroke, and press the writing tool more lightly when going from bottom to top, creating a lighter and thinner stroke.

In one embodiment, the thickness of a line varies based on the speed of the writing tool along the surface of a touch sensitive display, (see FIG. 2, 122). In particular, the line gets thinner when the pen (for example) moves faster, and gets thicker when the pen moves slower. This ink 122 emulates how a Chinese calligraphy brush interacts with Chinese calligraphy paper. When the brush moves faster, the ink has less time to spread, leaving a thinner line. When the brush moves slower, the ink has more time to spread and leaves a thicker line. The following picture shows the effect of this ink.

In an embodiment of this disclosure, the default setting for inking is based on the language setting of the system 100. See Table 1, below. Here the ink will be speed based if the system language is CJK (one of the Chinese, Japanese, and Korean languages). Otherwise, the ink will be direction based.

TABLE 1

```
if    language == Chinese || language == Japanese || language == Korean
          default_ink := speed_based_ink
else
          default_ink := direction_based_ink
endif
```

According to an embodiment of this disclosure, once a user starts to write, the system will determine the context of the writing. The categorization of the context can be based on one or more of the following statistics pertaining to the strokes made within a predetermined number of prior strokes or within a predetermined length of time before the current ink stroke: a) the average length of strokes—L, (see Table 2, below), which is how long a stroke is; b) the "straightness" of strokes—S, which is how close a stroke follows a straight line (see discussion of FIG. 3, below); and c) the spatial distribution of strokes—D, which is how strokes which are adjacent in time are distributed spatially. There are two types of distributions in this example. The first is a linear distribution in which the strokes are distributed linearly from left to right or from right to left with occasional short strokes going back in opposite direction but still within the proximity vertically, (crossing the t's and dotting the i's). This is the distribution typical of English (or other Roman letter based language) handwriting. The second distribution is two dimensional, in which the strokes are distributed both horizontally and vertically, with many overlapping strokes. This is the distribution typical of CJK language handwriting. The context can be determined by the logic shown in Table 2, in which TL1, TL2, TL3 are thresholds for average length of the strokes, and TS1, TS2, TS3 are thresholds for "straightness" measurement of the strokes.

TABLE 2

```
if    L < TL1 && S < TS1 && D == linear
          context := cursive_writing
else if L < TL2 && S > TS2 && D == two_dimensional
          context := CJK_language
else if L > TL3 && S > TS3
          context := diagram
endif
```

Handwriting of Roman letter based languages has strokes that are curly (far from straight line), relatively short, and distributed linearly, whereas the handwriting of CJK languages uses strokes that have more straight line segments, are much shorter, and have a two-dimensional distribution. Drawings of diagrams often use longer and straight strokes. Thus, handwriting of Roman letter based languages and CJK languages, as well drawing-type strokes, can be detected and rendered in an appropriate ink using the logic set out in Table 2. According to this embodiment, once the context is determined the systems 100 will select an ink that best fits the context. For example, cursive writing can be shown in direction based ink, CJK writing can be depicted in speed based ink, and drawings can be depicted in ink having a constant thickness.

FIG. 2 illustrates a presentation system 100 displaying different types of ink. If the system 100 detects touch screen gestures which correspond to drawing shapes, ink which is appropriate for shapes 118 displayed. Such gestures could include strokes which start and end near one another, such as in rectangular shape 119, triangular shape 121 and circular shape 123. If the system 100 detects touch screen gestures corresponding to English handwriting, ink which is appropriate for English handwriting 120 is displayed in response. For example, the system 100 may determine that substantially continuous (few finger removals than for shapes 118) moving touch contacts are being made in a generally rightward direction. The system 100 can also be configured to display ink more appropriate to oriental writing (such as the Chinese writing 122 shown below the English language ink 120) upon detecting strokes which move in an overall general direction, involve more finger lifts (are less continuous, have a greater number of shorter strokes, for example) than when drawing shapes or when writing in English. This type of "auto-scripting" is thus much more user friendly than requiring the user to make manual selections (104) each time the user wants to make a change of ink.

Figure 3:
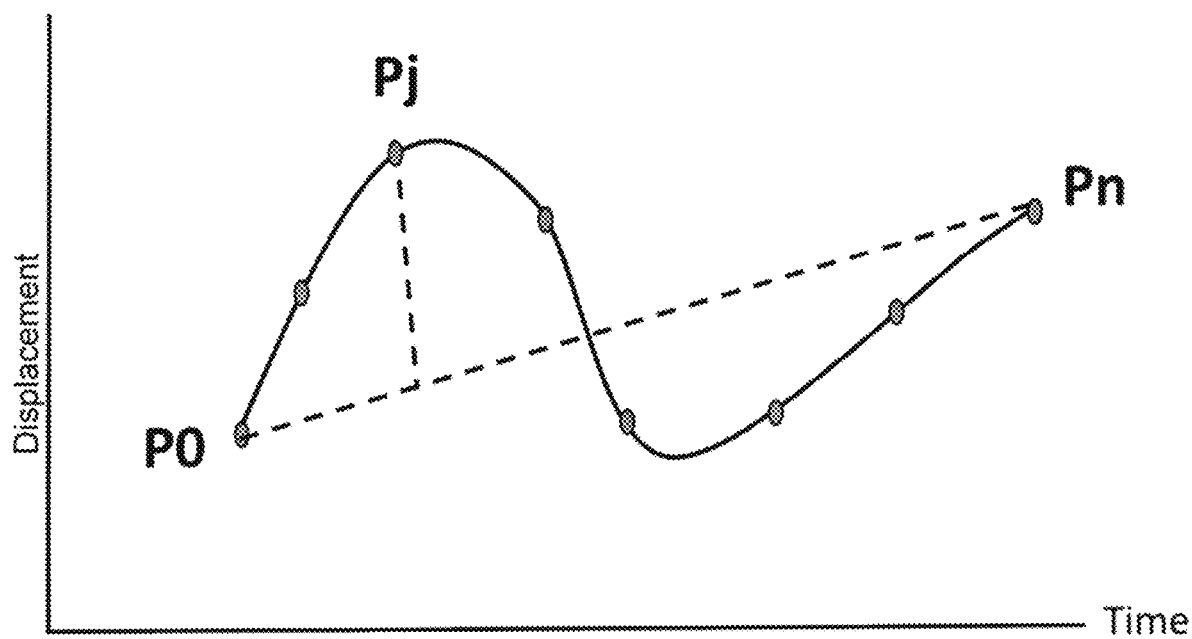
FIG. 3 illustrates a plot corresponding to a method of quantifying the straightness of a stroke in accordance with an embodiment of this disclosure.

In presentation system 100, a stroke is a collection of touch points $\{P_j=(x_j, y_j)\}$ that the touch screen registers from the moment a finger touches down, till the finger lifts off. Whether a stroke is straight or curved is an important feature to take into consideration to determine the context of the writing/drawing. FIG. 3 illustrates a plot corresponding to a method of quantifying the straightness of a stroke discussed above, (see "S" of Table 2), in which the straightness of a stroke $\{P_j\}$ is defined as the average of the distances from each point $(P_j)$ to a fitting straight line. In the simplest construction, the fitting line is merely the straight line connecting the first point $(P_0)$ and the last point $(P_n)$. Thus, the straightness (S) of a stroke is obtained according to the following equation:

$$S = \sum_{j=0}^{n} \frac{\|(P_j - P_0) \times (P_n - P_0)\|}{n\|P_n - P_0\|}$$

In which the x operator is the cross product of two vectors, and the $\|\ \|$ operator is the magnitude of a vector. In a more accurate, but much more compute intensive construct, the fitting straight line can be obtained by linear regression method. In that case, the above equation still applies, with $P_0$ and $P_n$ being replaced by the starting and ending point of the new fitting line.

As noted previously, when drawing on a digital whiteboard with one's finger, it is common to have one's wrist or knuckles accidentally touching the touch surface, resulting in false detection of multi-finger touch. In systems in which single finger drawing and multi-finger gestures are automatically detected without user explicitly selecting mode, this can cause disruption to the drawing. Sometimes the wrist and knuckles causes a detection of "pan" gesture, and sometimes they are falsely recognized as "erase" gesture. Thus one goal of this disclosure is to provide an intelligent method of recognizing and ignoring accidental wrist and knuckles, thereby enabling accuracy in drawing and writing.

Figure 4:
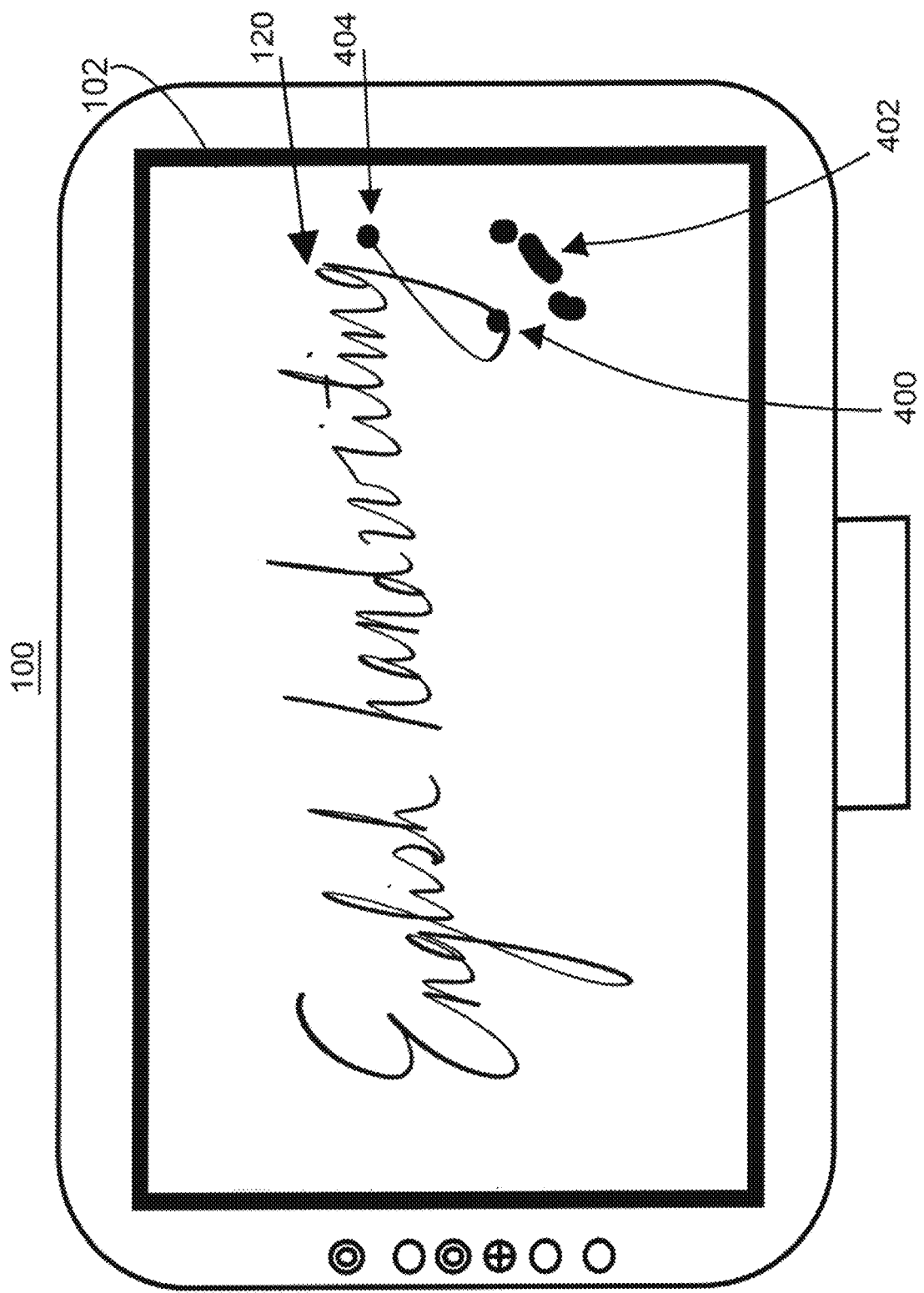
FIG. 4 illustrates a presentation system configured to ignore extraneous detected gestures in accordance with an embodiment of this disclosure.

FIG. 4 illustrates a presentation system 100 configured to ignore extraneous detected gestures (wrists, knuckles, etc.). In FIG. 4, as the traces her finger from point 400 to point 404 to finish the tail of the letter "g" in English 120, the user has also made contact in the 402 region. These contacts 402 could have been caused by user's accidentally bumping the touch screen 102 or resting her wrist while writing. The system 100 is configured to differentiate these incidental contacts 402 from those corresponding to the writing 120. The touch screen 102, in the embodiment shown, will therefore not display annotations or markings responsive to detected contacts 402.

At least one embodiment of this disclosure is method for rejecting extraneous contacts as illustrated in FIG. 4. The method is part of one or more of the gesture detection methods described above. The gesture detection can be divided into two phases in time. The first phase corresponds to determining a gesture type. A gesture can be one the following types: a) a draw gesture, comprising a single finger gesture for drawing and writing; b) a panning gesture, comprising a multi-finger gesture having parallel movement of fingers in substantially the same direction; c) a zoom, comprising a multi-finger gesture in which the distance between the user's fingers changes dramatically, and the fingers move in different directions away from a single region or point; and d) an erase gesture, in which fingers move in short back and forth strokes or in circular motion, (see the discussions of FIG. 6 and FIG. 7 below). The first phase usually lasts between about zero and 150 milliseconds.

In the first phase the gesture type is under evaluation. There is no "locking in" of any gesture type until at the very end of this phase. The gesture could begin with a single finger touch, but moments later additional touch points could be detected. A determination must therefore be made as to whether the additional touch points are commensurate with an (user-intended) multi-finger gesture or merely accidental contacts, (from wrist or knuckles, for example). According to the method, the characteristics of each touch point are tracked over a (short) period of time, normally about 100 milliseconds. The touch point of an intentional drawing action by a finger (or stylus) will generally have the following characteristics: it is the highest touch point among all touch points; its touch area changes very little once started; and its area (size) is within certain range. The logic of the method of rejecting extraneous contacts is expressed in Table 3 below, in which s[i] is the average size of the ith touch point over time (within a relevant range), sdev[i] is the standard deviation of the touch point size over time for the ith touch point, y[i] is the average vertical position of the ith touch point, TS1 and TS2 are touch size thresholds (maximum and minimum), and Tdev is a threshold for the standard deviation sdev[i].

TABLE 3

```
num_of_real_touch_point = 0;
highest_position = SCREEN_BOTTOM;
for (i = 0; i < num_of_touch_points; i++) {
    if (s[i] > TS1 && s[i] < TS2 && sdev[i] < Tdev) {
        num_of_real_touch_point ++;
        real_touch_point_index = i;
    }
    if (y[i] < highest_position) {
        highest_position = y[i];
    }
```

TABLE 3-continued

```
    }
    if (num_of_real_touch_point == 1 &&
        y[real_touch_point_index] == highest_position) {
        gesture = DRAW;
        primary_touch_point = real_touch_poitn_index;
    }
```

Once a gesture is determined in the first phase, the gesture is processed in the second phase. If the gesture is a draw gesture the marking is made by connecting touch points from the primary touch pointer to form a continuous line. If the gesture is determined to be a pan gesture, an amount of displacement for displayed content is calculated and the content is shifted accordingly. If the gesture is a zoom, a scaling factor of the gesture is calculated, and the portions of the displayed content are enlarged accordingly. If the gesture is an erasing gesture, multiple eraser lines are created, one for each touch pointer (movement of a touch contact along the surface of the touch sensitive display. In phase 2 the gesture type is "locked in." This means that even if there are accidental touches of wrist and knuckles during this phase, the "draw" gesture will continue to be in effect, and thus finger that was determined to be the primary touch pointer in the first phase will be only touch point recognized for purposes of drawing or writing. Once the gesture is completed by the user's terminating the touch (removing her finger from the display 102), the system 100 will return to the first phase when a new touch contact is detected.

Figure 5A:
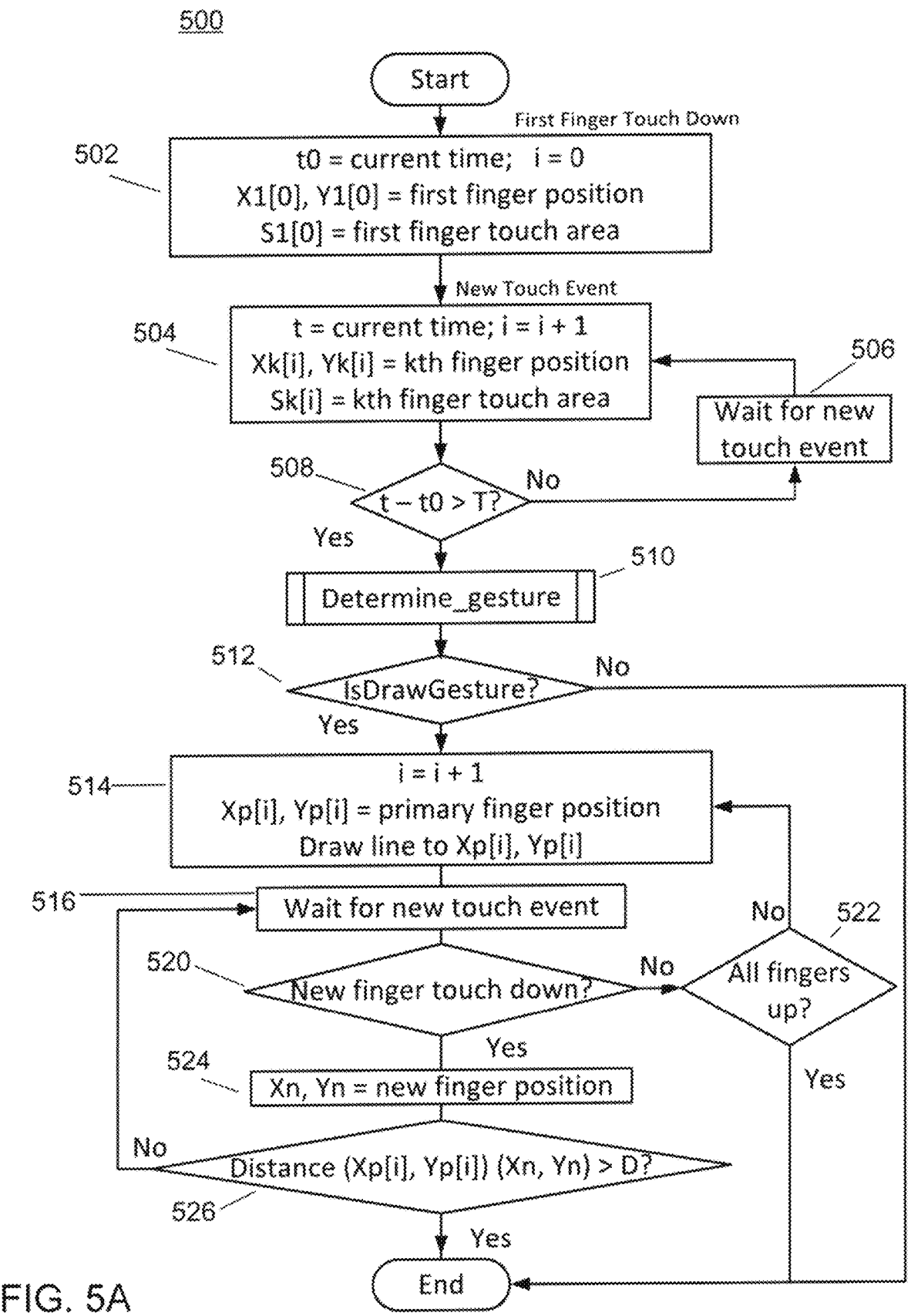
FIG. 5A illustrates a method of ignoring extraneous gesture in accordance with an embodiment of this disclosure.

FIG. 5A illustrates a method (500) of ignoring extraneous gestures. The method 500 begins at step 502 when a first touch contact is detected. Thereafter new touch positions i are detected until time t. The length of time from the first contact to the time of last touch point is then calculated 508. If the length of time from the first contact to the time of last touch point (kth finger position) is less than a threshold amount (T), the contact is ignored 506. If the gesture from lasted longer than the threshold, the type of the gesture from X1[0], Y1[0] to Xk[t], Yk[t] will be determined 510. The method 500 then determines if the gesture was a draw gesture, if not the method ends. If it was a draw gesture, a line will be shown on the display 102 tracking the course of the drawing finger. The method 500 then proceeds to step 516 in which the system 100 waits for a new touch event. If a new touch is not detected 520, the method 500 proceeds to determine if all fingers are up, and if not the method will return to step 514, otherwise it will end. If, one the other hand, a new touch is detected 520, a new finger position is set 524 and a determination 526 is made as to whether the distance of the new finger position from the ending point of the draw gesture (of 512) exceeds threshold D. If so the method 500 ends. If not the system 100 will return to step 516 to await a new touch event.

Figure 5B:
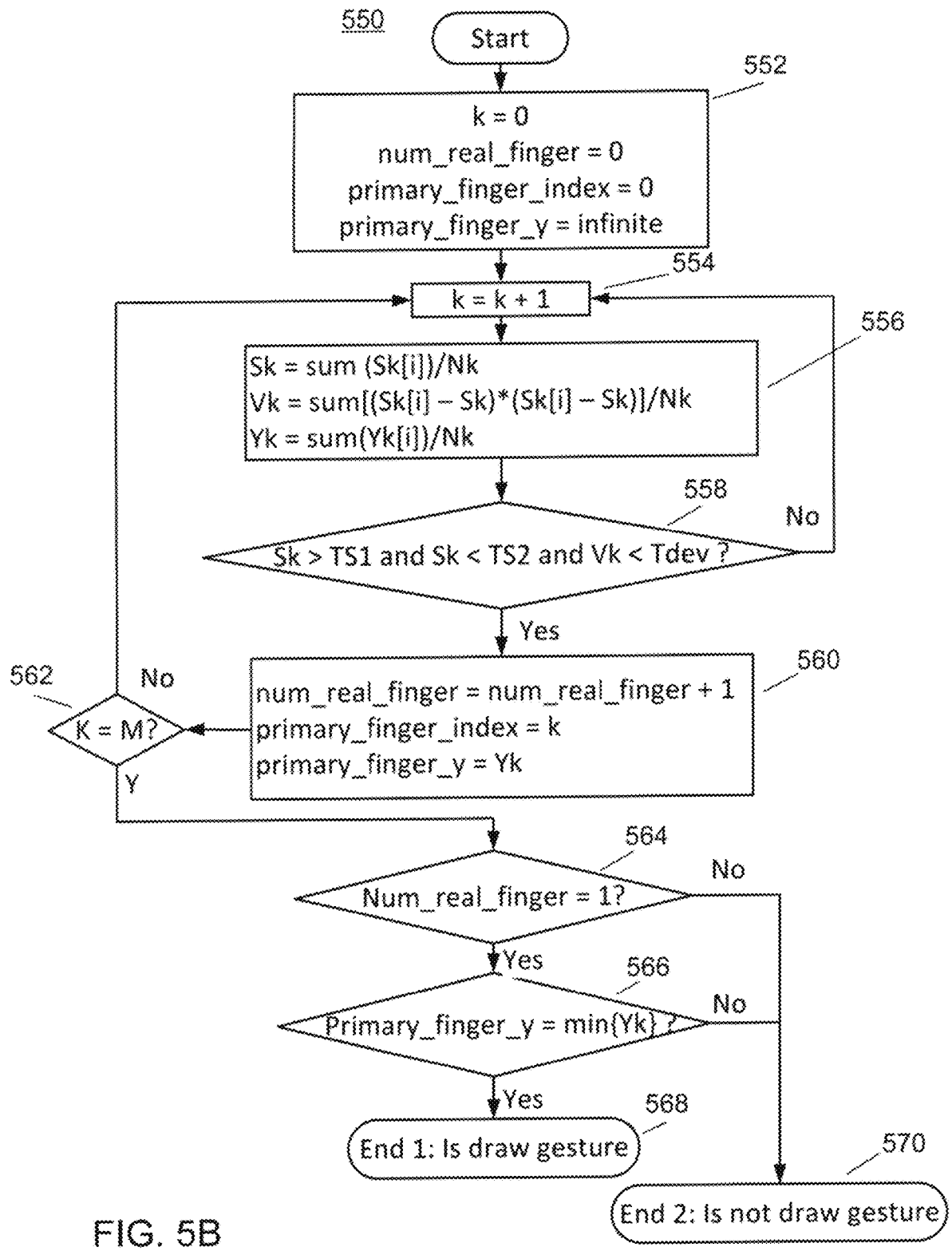
FIG. 5B illustrates a method of determining a type of a gesture, in accordance with an embodiment of this disclosure.

FIG. 5B illustrates a method 550 of determining (510) a type of a gesture, in which input {Xk[i], Yk[i]} corresponds to the collection of touch point positions of step 504, k is the kth finger of step 504, and i is the ith sample of touch position of a given finger of step 504, {Sk[i]} is the collection of touch point sizes for k, i is the ith sample of touch point size of a given finger, Nk is quantity of samples of a given finger and M is number of fingers, TS1 is the minimum touch size of a real finger, TS2 is the maximum touch size of a real finger, and Tdev is the maximum variance of touch size samples of a real finger. The method 550 begins when information corresponding to a detected gesture is received 552. Primary_finger_y corresponds to the vertical value (y coordinate) of a touch point from the top of the display screen in question. Thus the lowest value of the y coordinate of a gesture corresponds to the highest touch point for the gesture. The initial value of primary_finger_y is therefore initially set to infinity (arbitrary great number) which corresponds to some point below the lower border of the display area. The value of k is then incremented 554. Thereafter Sk, Vk and Yk are calculated 556. If these values are determined 550 to not correspond to a real finger, the method returns to step 554. If these values do so correspond, the method determines 562 whether N equals M. If N and M are not equal, the method 500 returns to step 554. If N and M are equal, the method 500 proceeds to 564 and determines if there is exactly one real finger contact in question. If there is not, the gesture is not a drawing gesture 570. If, however, there is exactly one real finger contact in question the method proceeds to determine 566 if the finger value is corresponds to the set min{Yk}. If it does so correspond the gesture is determined to be a draw gesture 568, otherwise the gesture not a draw gesture 570.

A user of a whiteboard will often wish to erase her writing or other markings. However, a user will have to either use a physical erasing tool, or make some kind of manual selection to tell the system an erasing action is desired. At least one embodiment of this disclosure is a presentation system which performs erasing by analyzing user actions and intelligently detecting an eraser gesture. A goal of this disclosure is to provide a system capable of distinguishing between an erasure gesture and other multi-touch point gestures such as pan and zoom. Determining whether an erasure gesture is intended by a user can be based on various factors including, but not limited to: (a) relative finger movements, (including speed and directions); (b) detecting back and forth movement; (c) detecting circular movements; (d) detecting palm/fist touches and (e) detecting physical eraser objects. Erasing type gestures can be based on the relative motion of each of the points of contact, including back and forth motions, very sharp changes in directions of motion, and circular motions, that are gradual but not in a uniform direct.

In at least one embodiment of this disclosure, once an erasing gesture has been determined, the properties of the "virtual eraser" can be affected by aspects of the gesture itself. For example, faster movements can cause the eraser to be enlarged. As another example, two or more finger tips can be placed close together to create a single larger eraser pointer. A system 100 can also be configured such that gestures which are wide in one direction can cause the eraser to be widened in a direction orthogonal to the first. The effect of enlarging the effective area of an erasing region can be to reduce the amount of time required to erase.

Figure 6:
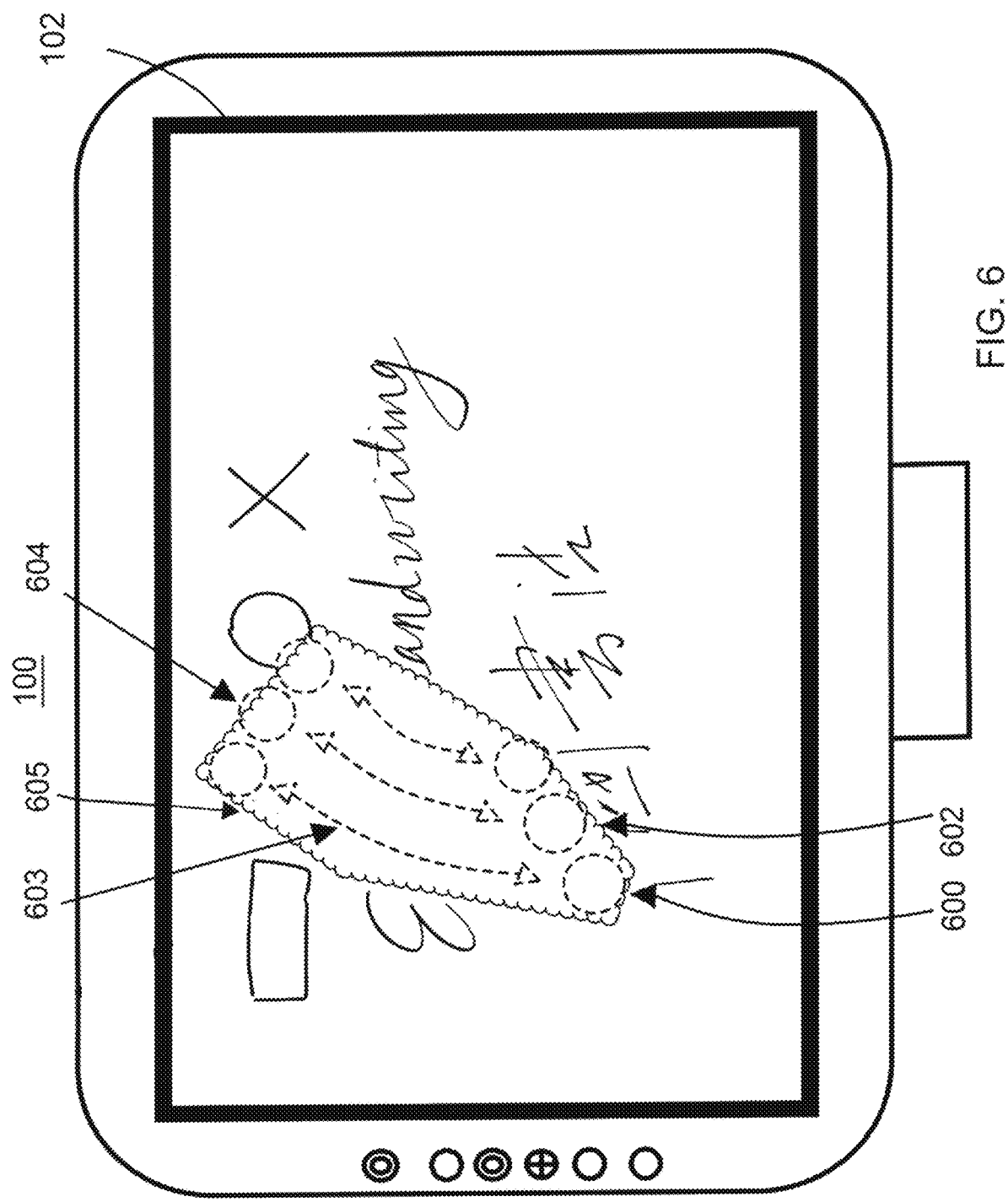
FIG. 6 illustrates a presentation system configured to erase portions of displayed writings and drawings, in accordance with an embodiment of this disclosure.

FIG. 6 illustrates a presentation system 100 in which a user is using a gesture to erase portions of her writings and drawings (see FIG. 2). In the embodiment shown, the user has placed three fingers at touch points 600 and moved them along paths 603 towards touch points 604. It can be seen that erasing area 605 extends beyond paths 603. The system 100 can be configured to change the size of the erasing area depending on the erasing gesture made. Types of erasing gestures include, but are not limited to, back and forth motions, larger sweeping motions, or multiple overlapping circular motions moving in a general direction, and combinations thereof. The system 100 can thus distinguish between an incidental touch contact made while writing (or drawing, annotating) and multiple substantially simultaneous touch contacts indicative of a user's intent to erase markings and annotations on the touch screen 102.

Figure 7:
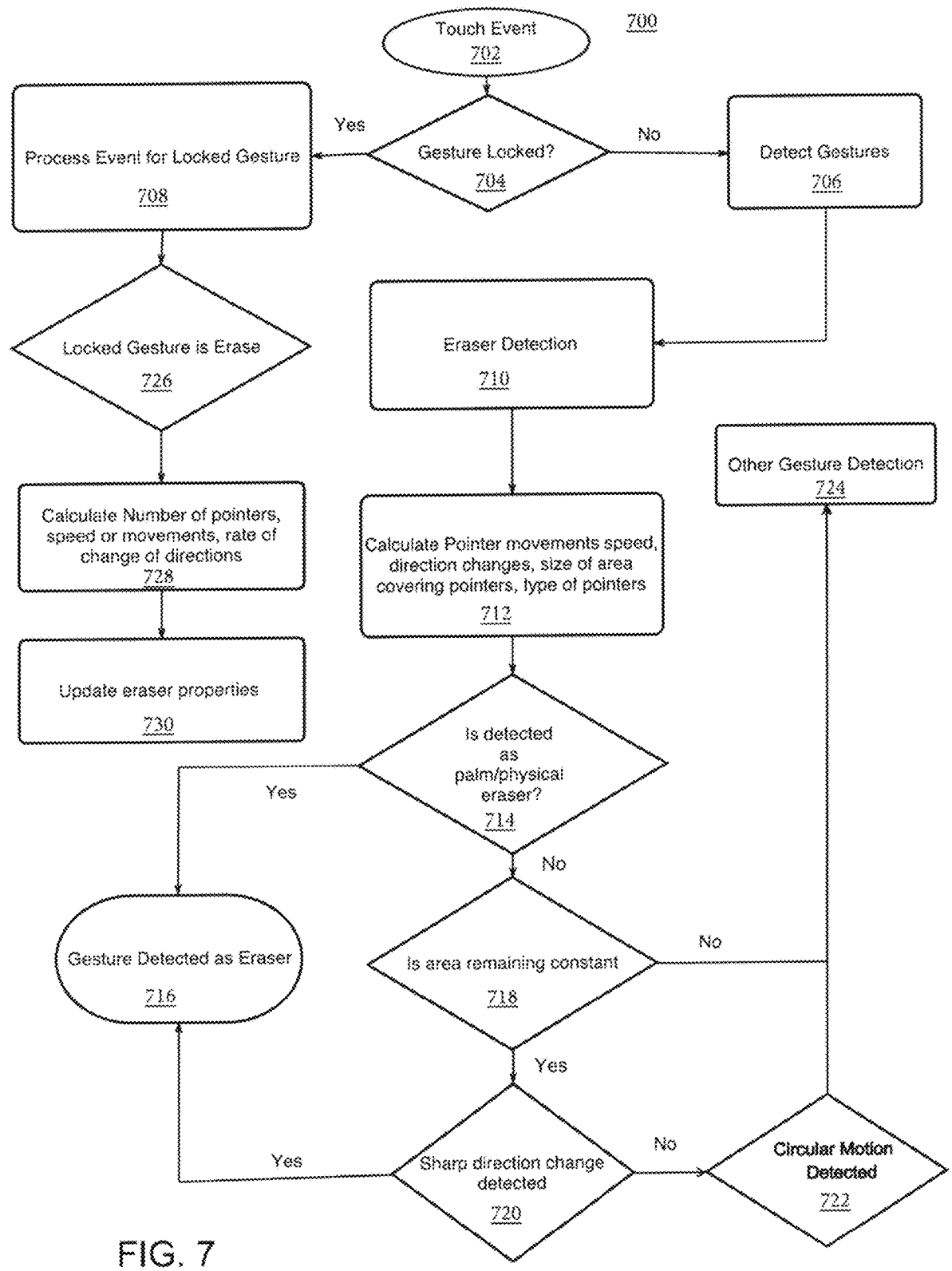
FIG. 7 illustrates a method of detecting erasure gestures in accordance with an embodiment of this disclosure.

FIG. 7 illustrates a method 700 of detecting erasure gestures in accordance with an embodiment of this disclosure. At step 702 a touch event 702, such as a finger making contact with touch screen 102, is detected. The system (100) then determines 704 whether a particular kind of gesture was previously locked. If a gesture is locked, the method 700 proceeds to step 708, which will be discussed below. If no gesture is locked, the system (100) will detect 706 one or more gestures. If the gestures correspond to an erasing type gesture then an eraser is detected at 710. The method 700 then proceeds to step 712 in which the particular details of the (virtual) erasure are determined. Determining the details of the erasure in question includes calculating the speeds of pointer (points of contact with touch screen (102)) movements, changes in direction of the points, the size of the area covered by the moving pointers, as well as the types of pointers (for example, small, large, hand, and fingers). The method 700 then proceeds to step 714, in which the system (100) determines 714 whether the erasing gesture corresponds to either a palm of a hand or a physical erasing tool. If the answer is yes, the detected gesture will be treated 716 as an erasure and the text or other markings present under the affected area will be no longer be displayed by the touch screen (102), that is they will be "erased" (see FIG. 6). The system (700) can be configured to store the data corresponding to the image displayed prior to the erasing action. If however, a palm or physical erasure is not detected at step 714, the method 700 proceeds to step 718 in which the system (100) determines whether the area affected by the touch points is remaining constant. If the area is not remaining constant, the system (100) determines that the gesture is (probably) not intended by the user to be an erasing action, and proceeds to step 724 in which the system (100) will determine whether another type of gesture is detected. On the other hand, if the system (100) determines 718 that the area is in fact remaining constant, the system (102) will determine 720 whether sharp changes in the direction of motion of the touch points are being detected (such as a sharp back and forth type motion). If sharp changes are detected 720, the method proceeds to step 716 and the gesture will cause markings or annotations etc. to be removed in the area where the motion occurred. If a sharp change in direction is not detected, the system (100) will determine 722 if a circular motion is detected. If so, the motion will be treated as an indication to draw a circular shape along the path of the motion, after which the system (100) will proceed to step 724 of the method 700. As described above, at step 724 of the method, the system (100) will detect other gestures as they are made by one or more users.

Figure 8:
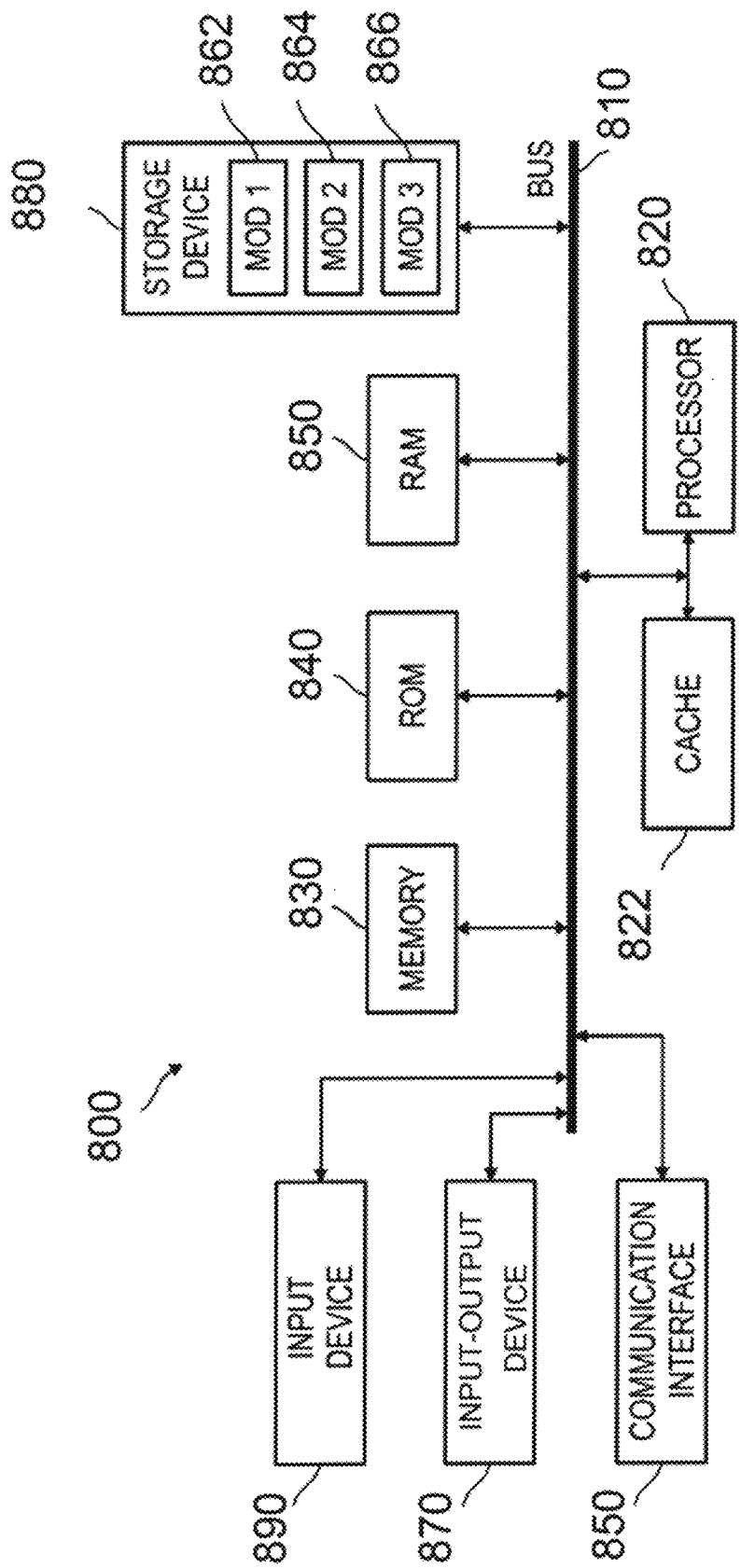
FIG. 8 illustrates an example presentation system which can be employed to practice the concepts and methods of this disclosure.

FIG. 8 illustrates an example presentation system 800 which can be employed to practice the concepts and methods described above. The components disclosed herein can be incorporated in whole or in part into tablet computers, personal computers, handsets, transmitters, servers, and any other electronic or other computing device. As shown, presentation system 800 can include a processing unit (CPU or processor) 820 and a system bus 810 that couples various system components including the system memory 830 such as read only memory (ROM) 840 and random access memory (RAM) 850 to the processor 820. The system 800 can include a cache 822 of high speed memory connected directly with, in close proximity to, or integrated as part of the processor 820. The system 800 copies data from the memory 830 and/or the storage device 860 to the cache 822 for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a presentation system 800 (or other computing device) having more than one processor 820 or on a group or cluster of computing devices networked together to provide greater processing capability. The processor 820 can include any general purpose processor and a hardware module or software module, such as module 1 (862), module 2 (864), and module 3 (866) stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output system (BIOS) stored in ROM 840 or the like, may provide the basic routine that helps to transfer information between elements within the computing device 800, such as during start-up. The presentation system 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer readable storage media provide non-volatile storage of computer readable instructions, data structures, program modules and other data for the presentation system 800. In one aspect, a hardware module that performs a particular function includes the software component stored in a non-transitory computer-readable medium in connection with the necessary hardware components, such as the processor 820, bus 810, input-output device 870, and so forth, to carry out the function.

Although the exemplary embodiment described herein employs the hard disk 860, other types of computer readable media which can store data that are accessible by a computer, such as magnetic cassettes, flash memory cards, digital versatile disks, cartridges, random access memories (RAMs) 850, read only memory (ROM) 840, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the presentation system 800, an input device 890 represents any number of input mechanisms, such as a microphone for speech, a touch-sensitive screen for gesture or graphical input, keyboard, mouse, motion input, speech and so forth. An input-output device 870, such as touch sensitive display (100) can comprise one or more of a number of output mechanisms. In some instances, multimodal systems enable a user to provide multiple types of input to communicate with the presentation system 800. The communications interface 880 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 8 is presented as including individual functional blocks including functional blocks labeled as a "processor" or processor 820. The functions these blocks represent may be provided through the use of either shared or dedicated hardware, including, but not limited to, hardware capable of executing software and hardware, such as a processor 820, that is purpose-built to operate as an equivalent to software executing on a general purpose processor. For example the functions of one or more processors presented in FIG. 8 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 840 for storing software performing the operations discussed below, and random access memory (RAM) 850 for storing results. Very large scale integration (VLSI) hardware embodiments, as well as custom VLSI circuitry in combination with a general purpose DSP circuit, may also be provided.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed so as to limit the scope of the disclosure. Various modifications and changes can be made to the principles and embodiments described herein without departing from the scope of the disclosure and without departing from the claims which follow. Any element in a claim that does not explicitly state "means for" performing a specified function, or "step for" performing a specific function, is not to be interpreted as a "means" or "step" clause as specified in 35 U.S.C. § 112, sixth paragraph.

The invention claimed is:

1. A presentation system, the presentation system comprising:
    a touch sensitive display;
    a processor coupled to the touch sensitive display; and
    a memory storing instructions and coupled to the processor, the instructions comprising instructions executable by the processor to cause the touch sensitive display to:
        detect a plurality of regular touch gestures;
        determine the nature of each of the plurality of regular touch gestures based on at least one factor;
        determine if at least two of the plurality of regular touch gestures should be grouped into a group based on the nature of each of the plurality of regular touch gestures; and
        display an indication corresponding to each of the plurality of regular touch gestures for a period of time,
        wherein the period of time of each of the plurality of regular touch gestures not grouped into a group is independent of each of the other of the plurality of regular touch gestures and is based on the nature of the regular touch gesture, and
        wherein the period of time of each of the plurality of regular touch gestures that are grouped into a group is dependent on the nature of each of the plurality of regular touch gestures that are in the group and are independent of each of the other of the plurality of regular touch gestures not in the group.

2. The presentation system of claim 1, wherein the at least one factor comprises a length of time to make the regular touch gesture.

3. The presentation system of claim 1, wherein the at least one factor comprises a length of the regular touch gesture along the touch sensitive display.

4. The presentation system of claim 1, wherein the at least one factor comprises a velocity of the regular touch gesture along the touch sensitive display.

5. The presentation system of claim 1, wherein the at least one factor used to determine the nature of a regular touch gesture that should be grouped into a group comprises whether the regular touch gesture is substantially the same shape, runs in substantially the same direction and took substantially the same time to make as a previous regular touch gesture.

6. The presentation system of claim 1, wherein the at least one factor used to determine the nature of a regular touch gesture that should be grouped into a group comprises whether the regular touch gesture on the touch sensitive display is made very near in time to a previous regular touch gesture.

7. The presentation system of claim 1, wherein the instructions further comprise instructions to extend the period of time that the indication of a regular touch gesture is displayed by detection of a subsequent special touch gesture, wherein the special touch gesture is one touching the indication of a previous regular touch gesture or maintaining a touch on the touch sensitive display for a predetermined amount of time.

8. A non-transitory computer readable medium storing instructions, the instructions comprising instructions executable by a processor to:
  detect a plurality of regular touch gestures on a touch sensitive display;
  determine the nature of each of the regular touch gestures based on at least one factor;
  determine if at least two of the plurality of regular touch gestures should be grouped into a group based on the nature of each of the plurality of regular touch gestures; and
  display, on the touch sensitive display, an indication corresponding to each of the plurality of regular touch gestures for a period of time,
  wherein the period of time of each of the regular touch gestures not grouped into a group is independent of each of the other of the plurality of regular touch gestures and is based on the nature of the regular touch gesture, and
  wherein the period of time of each of the plurality of regular touch gestures that are grouped into a group is dependent on the nature of each of the plurality of regular touch gestures that are in the group and are independent of each of the other of the plurality of regular touch gestures not in the group.

9. The non-transitory computer readable medium of claim 8, wherein the at least one factor comprises a length of time to make the regular touch gesture.

10. The non-transitory computer readable medium of claim 8, wherein the at least one factor comprises a length of the regular touch gesture along the touch sensitive display.

11. The non-transitory computer readable medium of claim 8, wherein the at least one factor comprises a velocity of the regular touch gesture along the touch sensitive display.

12. The non-transitory computer readable medium of claim 8, wherein the at least one factor used to determine the nature of a regular touch gesture that should be grouped into a group comprises whether the regular touch gesture is substantially the same shape, runs in substantially the same direction and took substantially the same time to make as a previous regular touch gesture.

13. The non-transitory computer readable medium of claim 8, wherein the at least one factor used to determine the nature of a regular touch gesture that should be grouped into a group comprises whether the regular touch gesture on the touch sensitive display is made very near in time to a previous regular touch gesture.

14. The non-transitory computer readable medium of claim 8, wherein the instructions further comprise instructions to extend the period time of that the indication of a regular touch gesture is displayed by detection of a subsequent special touch gesture, wherein the special touch gesture is one touching the indication of a previous regular touch gesture or maintaining a touch on the touch sensitive display for a predetermined amount of time.

15. A computer implemented method for a presentation system which includes a touch sensitive display, the method comprising:
  detecting a plurality of regular touch gestures on the touch sensitive display under control of a processor;
  determining, by the processor, the nature of each of the regular touch gestures based on at least one factor;
  determining, by the processor, if at least two of the plurality of regular touch gestures should be grouped into a group based on the nature of each of the plurality of regular touch gestures; and
  displaying, on the touch sensitive display, an indication corresponding to each of the regular touch gestures for a period of time,
  wherein the period of time of each of the regular touch gestures not grouped into a group is independent of each of the other of the plurality of regular touch gestures and is based on the nature of the regular touch gesture, and
  wherein the period of time of each of the plurality of regular touch gestures that are grouped into a group is dependent on the nature of each of the plurality of regular touch gestures that are in the group and are independent of each of the other of the plurality of regular touch gestures not in the group.

16. The method of claim 15, wherein the at least one factor comprises a length of time to make the regular touch gesture.

17. The method of claim 15, wherein the at least one factor comprises a length of the regular touch gesture along the touch sensitive display.

18. The method of claim 15, wherein the at least one factor comprises a velocity of the regular touch gesture along the touch sensitive display.

19. The method of claim 15, wherein the at least one factor used to determine the nature of a regular touch gesture that should be grouped into a group comprises whether the regular touch gesture is substantially the same shape, runs in substantially the same direction and took substantially the same time to make as a previous gesture.

20. The method of claim 15, wherein the at least one factor used to determine the nature of a regular touch gesture that should be grouped into a group further comprises whether the regular touch gesture on the touch sensitive display is made very near in time to a previous regular touch gesture.

21. The method of claim 15, further comprising extending the period of time that the indication of a regular touch gesture is displayed by detection of a subsequent special touch gesture, wherein the special touch gesture is one touching the indication of a previous regular touch gesture or maintaining a touch on the touch sensitive display for a predetermined amount of time.

* * * * *